United States Patent [19]

Fisli

[11] Patent Number: 5,617,132
[45] Date of Patent: Apr. 1, 1997

[54] METHOD AND APPARATUS FOR ADJUSTING THE PIXEL PLACEMENT IN A RASTER OUTPUT SCANNER

[75] Inventor: Tibor Fisli, Los Altos Hills, Calif.

[73] Assignee: Xerox Corporation, Stamford, Conn.

[21] Appl. No.: 352,781

[22] Filed: Dec. 1, 1994

[51] Int. Cl.⁶ .............................. B41J 2/47; G11B 7/00; G11B 7/08; H04N 1/23
[52] U.S. Cl. ............................................. 347/235; 347/129
[58] Field of Search .................................. 347/129, 235, 347/249, 250, 260, 116

[56] References Cited

U.S. PATENT DOCUMENTS

| | | | |
|---|---|---|---|
| 4,365,256 | 12/1982 | Byckling | 347/249 |
| 4,474,422 | 10/1984 | Kitamura | 359/218 |
| 4,622,593 | 11/1986 | Curry | 358/410 |
| 4,847,642 | 7/1989 | Murayama et al. | 347/116 |
| 4,903,067 | 2/1990 | Murayama et al. | 347/129 |
| 5,243,359 | 9/1993 | Fisli | 347/134 |
| 5,341,158 | 8/1994 | Appel et al. | 347/241 |
| 5,426,528 | 6/1995 | Yamamoto et al. | 347/235 |

OTHER PUBLICATIONS

"Laser Scanning for Electronic Printing," *Proceedings of the IEEE*, vol. 70, No. 6, pp. 597–618, by John C. Urbach et al.

Primary Examiner—Benjamin R. Fuller
Assistant Examiner—L. Anderson
Attorney, Agent, or Firm—Oliff & Berridge

[57] ABSTRACT

A raster scanning optical system and method for adjusting the pixel placement of light beams being scanned across an image receiving device. A spot velocity of a first laser beam is measured and then a spot velocity of a second laser beam is measured. From these measurements, the pixel positions of each of the beams can be determined. The firing rate of the second laser beam is then adjusted to adjust the pixel placement of the second beam. This helps avoid problems caused by tangentially offset laser diodes that scan with varying spot linearities.

27 Claims, 6 Drawing Sheets

METHOD AND APPARATUS FOR ADJUSTING THE PIXEL PLACEMENT IN A RASTER OUTPUT SCANNER

BACKGROUND OF THE INVENTION

1. Field of the Invention

This invention relates generally to correcting the pixel placement of light beams in a raster output scanner. More particularly, this invention relates to adjusting a firing rate of two tangentially offset light beams so as to correct the pixel placement on the surface of the image receiving member.

2. Description of Related Art

Flying spot scanners (often referred to as raster output scanners or ROSs) conventionally have a reflective multi-faceted polygon mirror that is rotated about its central axis to repeatedly sweep one or more intensity modulated beams of light across a photosensitive recording medium in a fast scan direction while the recording medium is being advanced in the slow scan direction (the process direction). The beams scan the recording medium based on a raster scanning pattern. Digital printing is performed by serially intensity modulating each of the beams in accordance with the binary sample string, whereby the recording medium is exposed to the image represented by the samples as it is being scanned. Printers that sweep several beams simultaneously are referred to as multi-beam printers. Both ROS and multi-beam printer techniques are illustrated in U.S. Pat. No. 4,474,422 to Kitamura, the subject matter of which is incorporated herein by reference.

High speed process color or multi-highlight color xerographic image output terminals typically simultaneously print multiple independently addressable raster lines at separate exposure stations. This is called multi-station printing. Conventional architectures for multi-station process color printers use a plurality of separate ROSs, usually four independent ROSs, one for each system color, for example, as illustrated in U.S. Pat. Nos. 4,847,642 and 4,903,067 to Murayama et al., the disclosures of which are incorporated herein by reference.

U.S. Pat. No. 5,243,359 to Tibor Fisli, the disclosure of which is incorporated herein by reference, discloses a ROS system suitable for deflecting multiple laser beams in a multi-station printer. A rotating polygon mirror simultaneously deflects a plurality of clustered, dissimilar wavelength laser beams, having their largest divergent angles parallel to one another. The laser beams are subsequently separated by a plurality of optical filters and are directed onto their associated photoreceptors. Similarly dimensioned spots are obtained on each photoreceptor by establishing similar optical path lengths for each beam. The lasers in U.S. Pat. No. 5,243,359 are arranged in the slow scan direction (i.e., sagittally offset). Diodes arranged in the slow scan direction must be arranged such that they are packed closely in a direction parallel to the polygon mirror's rotational axis to minimize beam characteristic deviations such as spot size, energy uniformity, bow and linearity. Thus, the laser diodes are kept as closely as possible (in the direction parallel to the polygon mirror's rotational axis) so the light beams strike nearly the same portion of the polygon mirror as possible.

U.S. Pat. No. 5,341,158 to James Appel et al., the disclosure of which is incorporated herein by reference, discloses a ROS system having laser beams tangentially offset in the fast scan direction (i.e., separated horizontally) to offset the diode spacing constraints of U.S. Pat. No. 5,243,359 to Fisli.

FIG. 1 illustrates a multi-station printer 10 similar to that disclosed in U.S. Pat. No. 5,341,158. In FIG. 1, the four laser beams, having different wavelengths, are reflected from the rotating polygon mirror 12. As the polygon mirror 12 rotates about its axis 13, the polygon mirror 12 simultaneously deflects the beams through a lens system 20 that focuses the beams and corrects for errors such as polygon angle error and wobble. The beams are then separated by optical filters 14, 16 and 18 and directed onto the photoreceptors 30, 32, 34 and 36 using mirrors 26. The multi-station printer 10 is preferably used for full color xerographic printing or copying. As is well known, each laser beam produces a latent image on its associated photoreceptor 30, 32, 34 and 36 that corresponds to a system color that will be transferred onto a recording medium (not shown), such as, for example, plain paper or an intermediate belt (not shown). The photoreceptors 30, 32, 34 and 36 can be, for example, belts or drums.

FIG. 2 illustrates two optical input channels used to scan two tangentially offset laser beams 41 and 51 across the polygon mirror 12. For example, laser diode 40 emits a laser beam 41 that passes through a collimator 42 and lens 44 before being reflected from the polygon mirror 12. Similarly, laser diode 50 emits a laser beam 51 that passes through a collimator 52 and lens 54 before being reflected from the rotating polygon mirror 12. Mirrors 46 and 56 may additionally be provided to direct the light beams 41 and 51 onto the rotating polygon mirror 12. As is clearly seen in FIG. 2, the two light beams 41 and 51 are tangentially offset in the fast scan direction.

Upon being reflected from the polygon mirror 12, each of the beams 41 and 51 passes through an $F_\theta$ lens 22 and an anamorphic element 24 onto the surface of a photoreceptor (not shown in FIG. 2). As is well known in the art, the $f_\theta$ lens 22 corrects for scan linearity in a well known manner. The anamorphic element 24 generally provides only limited power for the sagittal focusing of the beam. For ease of illustration, the post polygon optics including lens 22 and element 24 only illustrates one beam. However, both beams 41 and 51 actually pass through the post polygon optics. Additionally, the lens 22 and element 24 of FIG. 2 may correspond to the lens system 20 of FIG. 1. The present invention is preferably used in a multi-spot system where two beams are tangentially offset as in FIG. 2.

Polygon scanners such as that described above with reference to FIGS. 1 and 2 are well known in the art and are described, for example, in "Laser Scanning for Electronic Printing," *Proceedings of the IEEE*, Vol. 70, No. 6, June 1982 by John C. Urbach et al., the disclosure of which is incorporated herein by reference. Other optical polygon scanner embodiments are similarly known and are within the scope of this invention.

FIG. 3 illustrates multiple laser diodes 40, 50, 60 and 70 formed on a single chip 38. As is shown in FIG. 3, each of the laser diodes 40, 50, 60 and 70 is tangentially offset in the fast scan direction (i.e., the X direction). The tangentially offset laser diodes are also described, for example, in U.S. Pat. No. 5,341,158 to Appel et al.

When separate laser beams are tangentially offset as in U.S. Pat. No. 5,341,158 to Appel et al., each of the laser beams strikes the polygon mirror 12 at a different angle. The present invention is preferably applicable to a much greater input angle between laser beams such as illustrated in FIG. 2 by the 10° angle offset between laser beams 41 and 51 prior to striking the current facet of the polygon mirror 12. FIG. 4 illustrates another embodiment of tangentially offset laser diodes 40 and 50. In FIG. 4, the laser diodes 40 and 50 are both sagittally offset (in the slow scan direction) and tangentially offset (in the fast scan direction). This is preferably used to create a pitch separation between scanning spots on a photoreceptor when multi-spot printing is used. Embodiments of the present invention will generally be described with respect to the tangentially and sagitally offset beams of FIG. 4. However, the description of this embodiment is in no way limiting.

FIGS. 5A–5B illustrate one preferred embodiment of how the ROS modulates the laser beams 41 and 51 as they are scanned along the fast scan direction. As is well known, the ROS may include a start of scan (SOS) detector 90 (such as a slit detector) used to control the start of scan of the laser beams 41 and 51 as they enter into the fast scan region. As is well known in the art, the SOS detector 90 generates a signal as a spot passes through it. The signal is sent to an electronic subsystem (ESS). The ESS controls the formatting and the flow of information (data stream) into the light modulator of the ROS. When laser diodes are used, the current input to the laser "driver" electronics is controlled. At the arrival of an SOS signal, the ESS clocks out a complete line of raster data. FIG. 5A shows each laser beam 41 and 51 having not yet reached the start of scan detector 90. Therefore, the beams 41 and 51 are not modulated onto the surface of a respective photoreceptor. FIG. 5B shows the start of scan detector 90 detecting the beam 51 but not detecting the beam 41 because of the tangential separation between the beams 41 and 51. The amount of separation between the two beams 41 and 51 is determined by the amount of separation between the laser diodes 40 and 50. For example, in FIGS. 5A–5B, the beams 41 and 51 are sagittally offset as indicated by distance A and are tangentially offset as indicated by distance B.

When beam 51 arrives at the SOS detector 90, the ESS clocks a complete line of raster data for that beam. This raster data generally includes a margin and the respective print data to be printed by the beam 51. The margin represents a delay of the laser diode 50 until the beam 51 is actually modulated onto the photoreceptor. As shown in FIG. 5B, the beam 41 has not yet reached the SOS detector 90. The delay between the beams 41 and 51 can be determined knowing the separation between the laser diodes 40 and 50 or by experimentation. As is well known in the art, once the beam 51 passes through the SOS detector 90, the necessary delay of the beam 41 is computed. This is accomplished by causing a greater delay for the beam 41 than for the beam 51 so that both beams can be modulated onto the photoreceptor at similar pixel positions in the fast scan direction. Thus, the margin for the beam 41 is greater than the margin for the beam 51.

FIG. 6 shows a pair of vertical lines 110 and 112 extending in a process direction. To produce the lines 110 and 112, the pixels of each of the beams 41 and 51 must be precisely positioned in the fast scan direction to properly modulate onto the photoreceptor. The light beam 51 will scan across the scan line 53 and be appropriately modulated by the ROS. The light beam 41 will be scanned across the scan line 43 and will also be independently modulated by the ROS.

As is apparent to those skilled in the art, when vertical lines are desired to be printed, the pixel placement of each of the light beams 41 and 51 must be precisely controlled. For example, if one of the light beams is modulated so that a pixel is misplaced (in terms of the fast-scan position) from the desired location by any amount, then the vertical lines will show jagged edges. Therefore, if both beams are scanned with similar scan linearity, then the prior art methods would compute the necessary delays between each of the beams 41 and 51 so that the vertical lines will be correctly modulated onto the photoreceptor to form the lines 110 and 112 with jagged edges. For example, if the vertical lines 110 and 112 are desired to be printed exactly one inch apart then the spot velocity for each of the beams 41 and 51 must be correct and perfectly linear.

However, when beams are tangentially offset as in FIG. 2, the scan linearity for each of the beams 41 and 51 differs as the beams are scanned across the scan lines 43 and 53. The scan linearity differences result from the light beams passing through different portions of the post-polygon optics. This is caused by the large tangential separation of the light beams in FIG. 2.

Therefore, the ROS computes the respective margins so that the light beams 41 and 51 are correctly modulated to a desired position to form the first vertical line 110 and the second vertical line 112. However, as explained above, because each of the beams may have a different scan linearity, the exact modulation of the beams 41 and 51 may not occur on the vertical lines 110 and 112 and a visual displeasing image may be printed. In other words, when the above described delay is implemented, all the scan lines can start in the required position. However, from then on the position of the pixels will not be correct because the spots will have different velocities due to the differences in the angular input of the beams.

SUMMARY OF THE INVENTION

This invention provides a method and apparatus for correcting problems caused by tangentially offset laser diodes.

This invention provides a method for correcting the placement of pixels in a raster scanning system. Initially, a spot velocity of a first beam is measured. Then a spot velocity of a second beam is measured. A firing rate of the second beam is adjusted to appropriately adjust the pixel placement of the second beam relative to the pixel placement of the first beam.

This invention additionally provides an apparatus for correcting the placement of pixels in a raster scanning system. The apparatus includes a first measuring device for measuring a spot velocity of a first light beam and a second measuring device that measures a spot velocity of a second light beam. An adjusting device adjusts a firing rate of the second light beam based on the spot velocity of the first beam.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 8:
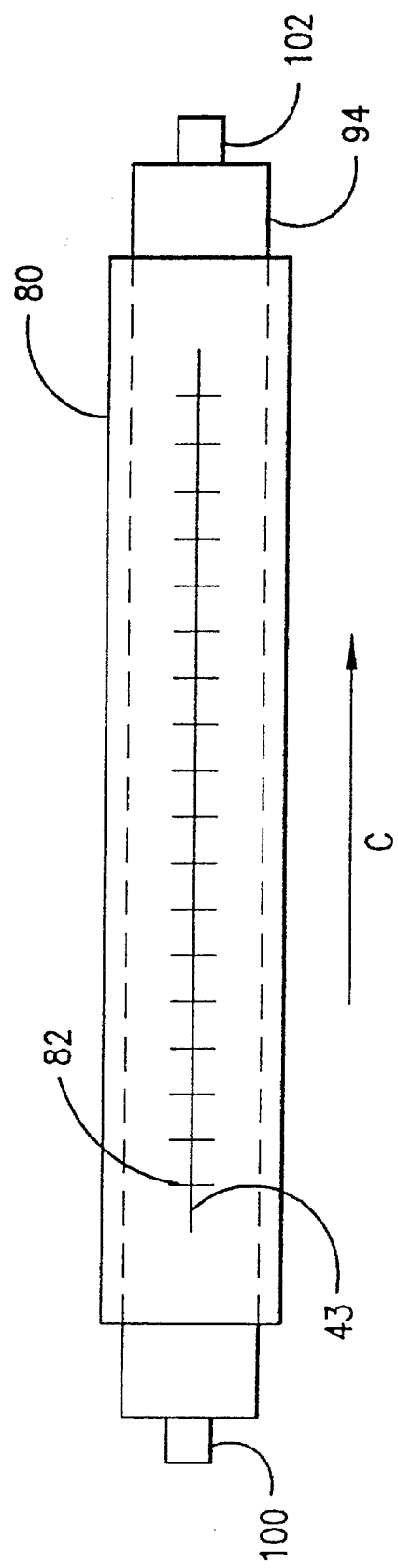
FIG. 8 illustrates a detecting device used in an embodiment of the present invention.
Figure 5A:
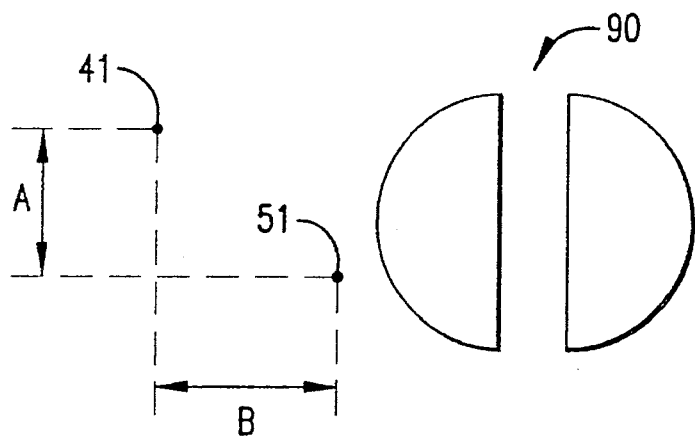
FIGS. 5A–5B show the movement of two laser beams as they are scanned across a start of scan detector.
Figure 5B:
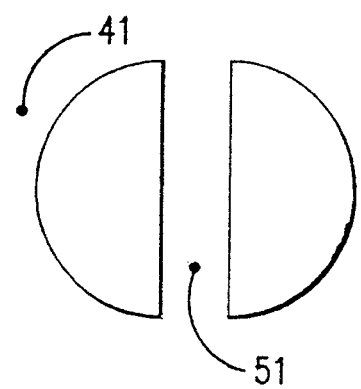
Figure 7:
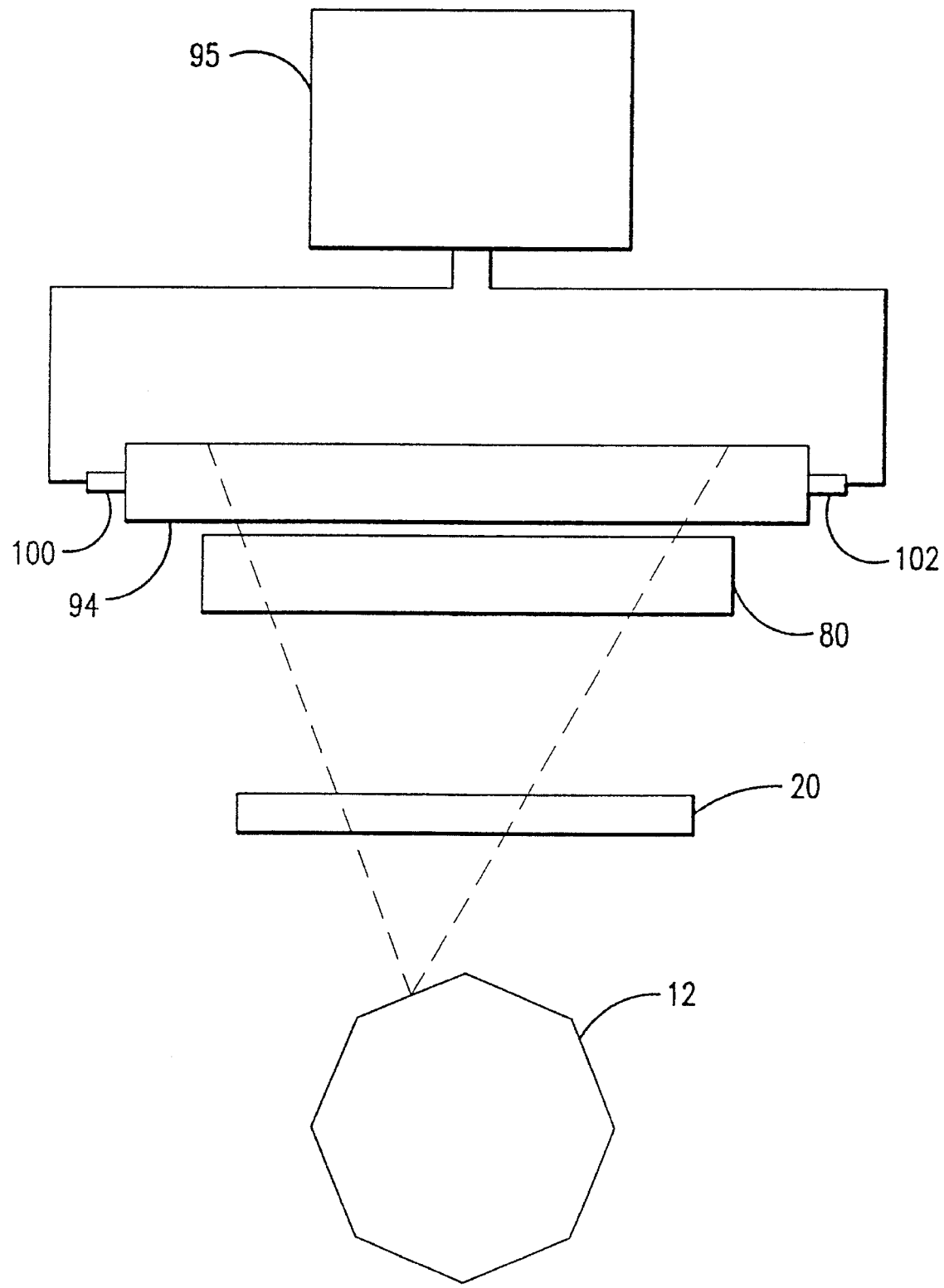
FIG. 7 illustrates an embodiment of the present invention.

FIG. 7 illustrates a preferred apparatus used to adjust the frequency of the beams 41 and 51 so that proper pixel position can be achieved for each of the beams. This helps solve problems caused by non-linearity between two beams, A rotating polygon mirror 12 rotates a laser beam through post polygon optics 20 (that may include lens 22 and element 24) and across a diffraction grating 80 as will be described below, FIG. 8 shows the diffraction grating 80 in greater detail. The grating 80 includes a number of openings or slits 82 spaced at a uniform spatial frequency across the grating 80. One example of such grating is a well known Ronchi ruling. Other diffraction gratings are also well known in the art. The frequency of the openings 82 across the grating 80 is known and is used, as described below, to compute the spot velocity of a beam relative to the fast scan position as the beam scans across the grating 80. The grating 80 allows the light beam to pass through the openings 82 as the beam is scanned.

Figure 9:
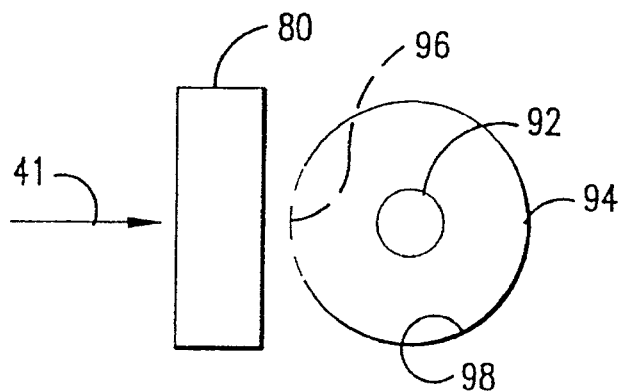
FIG. 9 illustrates a side view of the detecting device of FIG. 8.

The light passes through the openings 82 and is detected as will be described. As shown in FIG. 8, an "integrating sphere" like device 94 (hereafter integrating sphere) extends along a longitudinal direction behind the grating 80. This light collecting device is shown in FIG. 9 to preferably include a glass tube 92 extending along the direction C. The tube 92 may similarly be a clear plastic rod or glass. An aperture 96 is provided in the integrating sphere 94 to allow the scanned light beam 41 to pass through the openings 82 and into the interior of the integrating sphere 94. Thus, the aperture 96 extends along the integrating sphere 94 directly between the tube 92 and the grating 80. The exterior wall 98 of the integrating sphere 94 is preferably coated with a highly reflective paint to ensure reflection of the light beam onto the glass tube 92.

The opposite longitudinal ends of the tube 92 are respectively connected to sensors 100 and 102 as shown in FIG. 8. These sensors preferably are photomultiplier tubes (PMT) or avalanche photo diodes as are well known in the art. Each of the sensors 100 and 102 are respectively connected to the computing device 95 (shown in FIG. 7) to detect the spot velocity relative to the fast scan position at which light beams strike the tube 92 within the integrating sphere 94.

The light beam 41 scans across the grating 80 to form a scan line 43 as shown in FIG. 8. The light beam 41 only passes through the grating 80 and onto the tube 92 when the beam 41 is positioned over one of the openings 82 on the grating 80. Accordingly, the light beam passes through a respective opening 82, through the aperture 96 and onto the tube 92. Each of the sensors 100 and 102 respectively detects the beam striking the glass tube 92 as will be described.

For example, when the beam 41 passes through the first opening 82 and onto the tube 92, each of the sensors 100 and 102 receives an intensity signal through the tube 92. Because the first opening 82 is closer to the sensor 100, the intensity signal received by the sensor 100 is greater than the intensity signal received by the sensor 102. The beam 41 continues scanning along scan line 43 in a direction C to a second opening. However, when light passes through the second opening and onto the tube 92, the intensity signal received by the sensor 100 is less than that received when the light passes through the first opening 82. This is because the light striking the tube 92 is further from the sensor 100. Similarly, the intensity of the signal received by the sensor 102 is greater than that for the first opening because the distance is closer to the sensor 102. However, the total intensity of both signals is equal for both above described examples because the overall distance to the sensors 100 and 102 remains constant. The beam 41 continues to scan across the scan line 43 while the sensors 100 and 102 continue to receive signals relating to the intensity levels. As is apparent, based on the intensity of the sensors 100 and 102, the placement of the beam (i.e., the spot velocity or the scan linearity) can be determined in relation to the fast scan direction.

A computing device 95 (shown in FIG. 7) is connected to each of the sensors 100 and 102. The computing device 95 calculates the spot velocity of the beam 41 relative to the fast scan position as the beam 41 is scanned based on the frequency that light strikes the tube 92 and is individually detected by the sensors 100 and 102. Data such as the spacing frequencies of the openings 82 is known prior to use and is used by the computing device 95 to calculate the spot velocity. The spot velocity is stored in the computing device 95. As will be described below, the grating 80, the tube 92, the sensors 100 and 102 and the computing device 95 are used to compute the appropriate pixel position along the scan line 43. As is apparent to those skilled in the art, the computing device 95 is able to compute the non-linearity of the beam 41 based on the spacing of the opening 82 and the frequency that the light is detected by the sensors 100 and 102.

Figure 2:
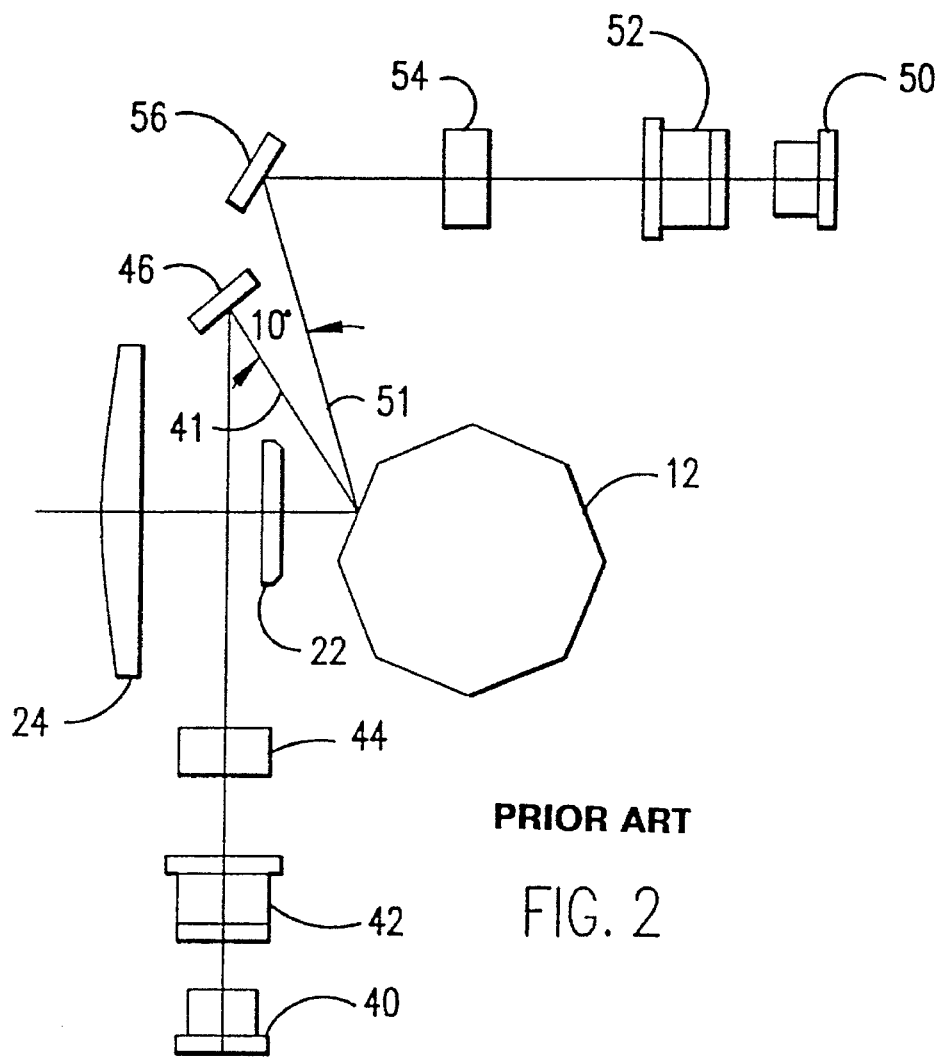
FIG. 2 is a top view of two tangentially offset laser beams.
Figure 4:
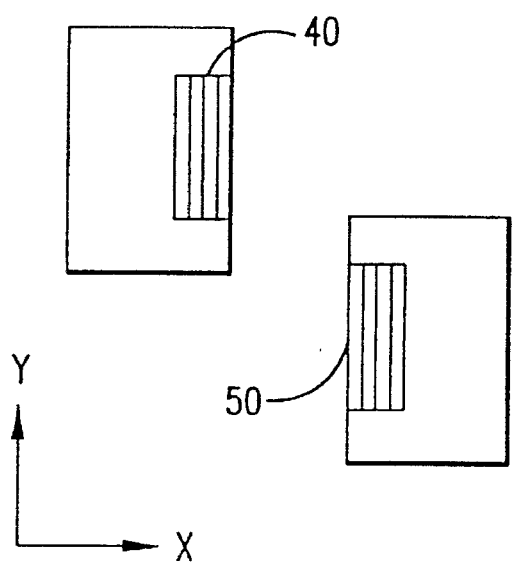
FIG. 4 shows one embodiment of tangentially and sagittally offset laser diodes.
Figure 3:
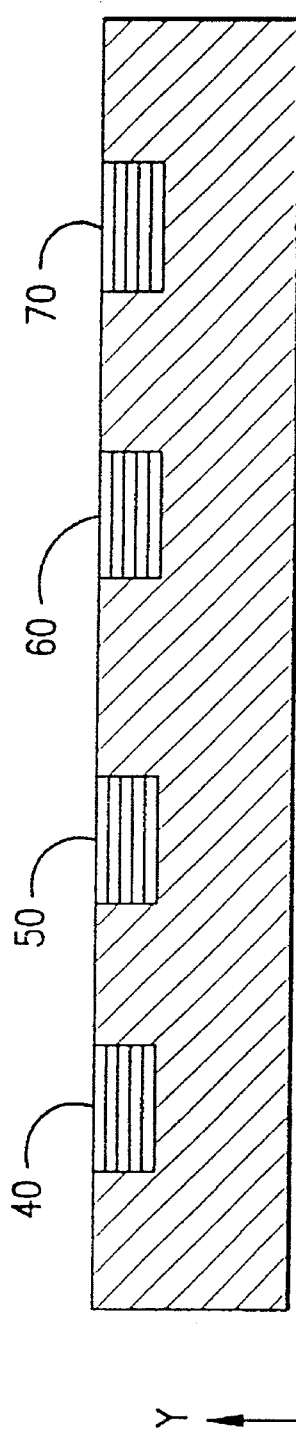
FIG. 3 shows one embodiment of tangentially offset laser diodes.
Figure 10:
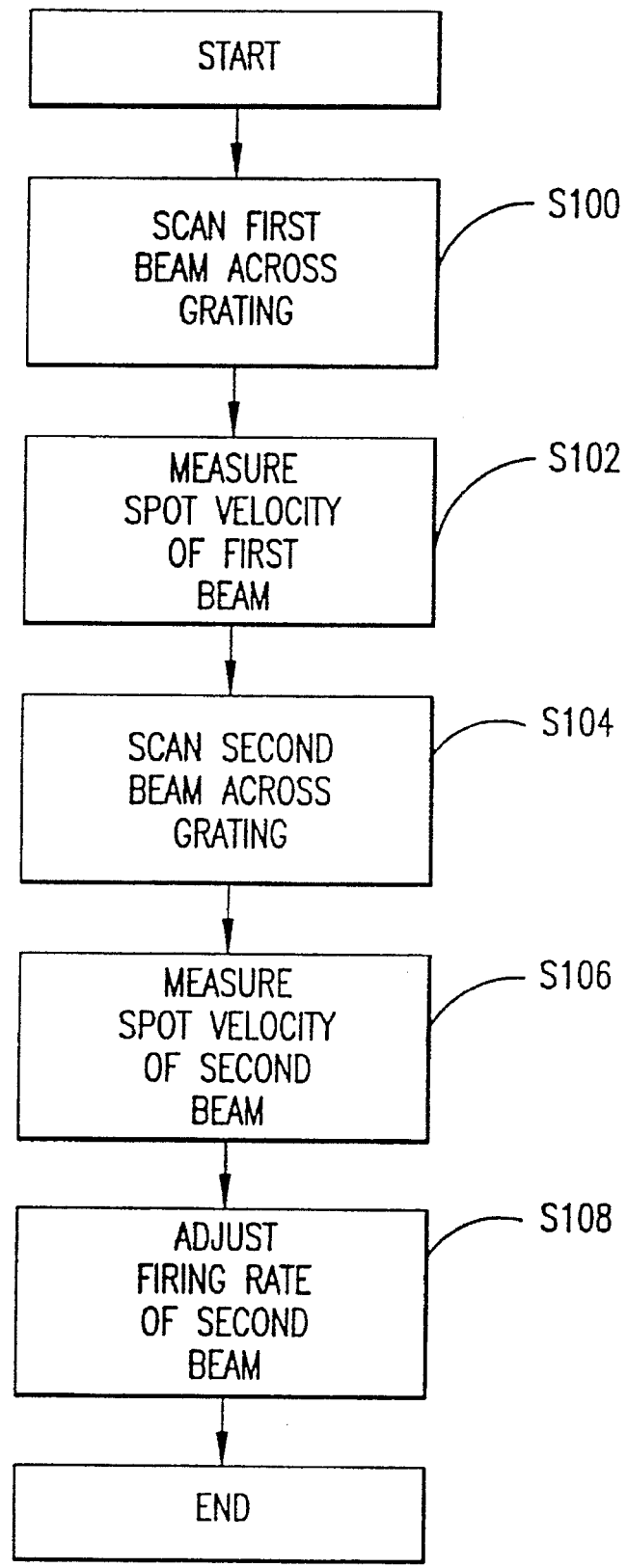
FIG. 10 is a flow chart of a method of the present invention.

FIG. 10 is a flow chart showing a preferred method for performing the present invention. In step 100, a first laser beam 51 (emitted from laser diode 50 shown in FIG. 2) is scanned across the grating 80 as described above. In step 102, the spot velocity of the first beam 51 relative to the fast scan position is computed knowing the spacing frequency of the openings 82 and the frequency at which the beam 51 strikes the tube 92. The frequency is computed as described above using the sensors 100 and 102. This embodiment will hereafter be described as having the proper pixel positions for the beam 51. That is, the pixel placement of the beam 51 falls within acceptable limits. Subsequently, a second light beam 41 (emitted from laser diode 40 shown in FIG. 2) is scanned across the grating 80 and onto the tube 92 in step 104. In step 106, the spot velocity of the second laser beam 41 relative to the fast scan position is computed in a similar manner to that of the first laser beam 51.

As was discussed above with respect to FIG. 6, each of the scan lines 43 and 53 may have a different scan linearity relative to the fast scan position because of the tangentially offset laser diodes 40 and 50. This may cause problems when images such as vertical lines 100 and 102 are desired to be printed with precision. That is, it is extremely undesirable for the fast scan pixel placement to vary between each of the beams 41 and 51 during a predetermined time. To correct this problem, the firing frequency of at least one of the light beams is adjusted such that both beams 41 and 51 are modulated to create equal pixel positioning for the beams. For example, in step 108, the firing frequency of the light beam 41 is adjusted as it scans across the scan line 43. To accomplish this, the computing device 95 preferably controls the firing frequency of the light beam 41 from the laser 40 as will be described below. In other embodiments, the rotational velocity of the polygon 12 may be adjusted to get appropriate pixel placement. In other embodiments, the firing frequency of the beam 51 may also be independently adjusted so that the pixels are appropriately positioned at desired locations. That is, the pixel placement of the beam 41 is made similar to the pixel placement of the beam 51 when the pixel placement of the beam 51 falls within acceptable limits. Otherwise, the pixel placement of both beams 41 and 51 is adjusted such that all pixels fall in their correct positions.

The adjustment of the firing frequency is well known in the art. For example, U.S. Pat. No. 4,622,593 to Douglas Curry, the disclosure of which is incorporated herein by reference, discloses a correction circuit for correcting scan speed variations. As disclosed in U.S. Pat. No. 4,622,593, a microprocessor creates a stream of sample clock pulses and removes pulses from the stream to lower the sample clock pulse rate and thus the data rate at which data is fed to the scanner. The system uses the fastest scan requiring the highest data rate, as the standard, and corrects the data rates of the other scans by slowing the data rates down. To do this, the microprocessor calculates the differences between the fastest scan and the other scans to determine how many of the clock pulses should be removed. The result is that the data for the slow scan is supplied at a slower rate to maintain a proportionality between the spot velocity and a data rate.

The computing device 95 of the present invention preferably includes such a firing frequency adjusting circuit as described in U.S. Pat. No. 4,622,593. Those skilled in the art will appreciate that other methods of adjusting the firing frequency are also within the scope of this invention. The computing device 95 will accordingly adjust the firing frequency of the beam 41 by adjusting the firing rate of the laser diode 40. This changes the placement of the pixels on the photoreceptor. In another embodiment, the firing frequency of each of the beams 41 and 51 will be adjusted so that appropriate pixel placement on the photoreceptor occurs.

The above-described apparatus preferably corrects the pixel placement of four or more laser beams. In a similar manner to that described above, a third laser beam is scanned over the grating 80 and onto the tube 92 and sensors 100 and 102. The firing frequency of the third beam is then adjusted to adjust the pixel placement of the photoreceptor. A fourth light beam can similarly be scanned across the grating 80 and onto the tube 92 to compute a fourth spot velocity relative to the fast scan position. The firing rate of the fourth laser beam is then appropriately adjusted to adjust the pixel placement. By so doing, each of the four laser beams will be scanned across the respective photoreceptors at the proper pixel position. Accordingly, this solves problems caused by tangentially offset laser beams that input laser beams at different angles and thereby have varying scan linearities. The above described embodiments control the firing rates of a second, third and even fourth light beam based on the desired pixel placement. It is also within the scope of this invention to adjust the firing rate of all the light beams within the raster scanning system.

Figure 1:
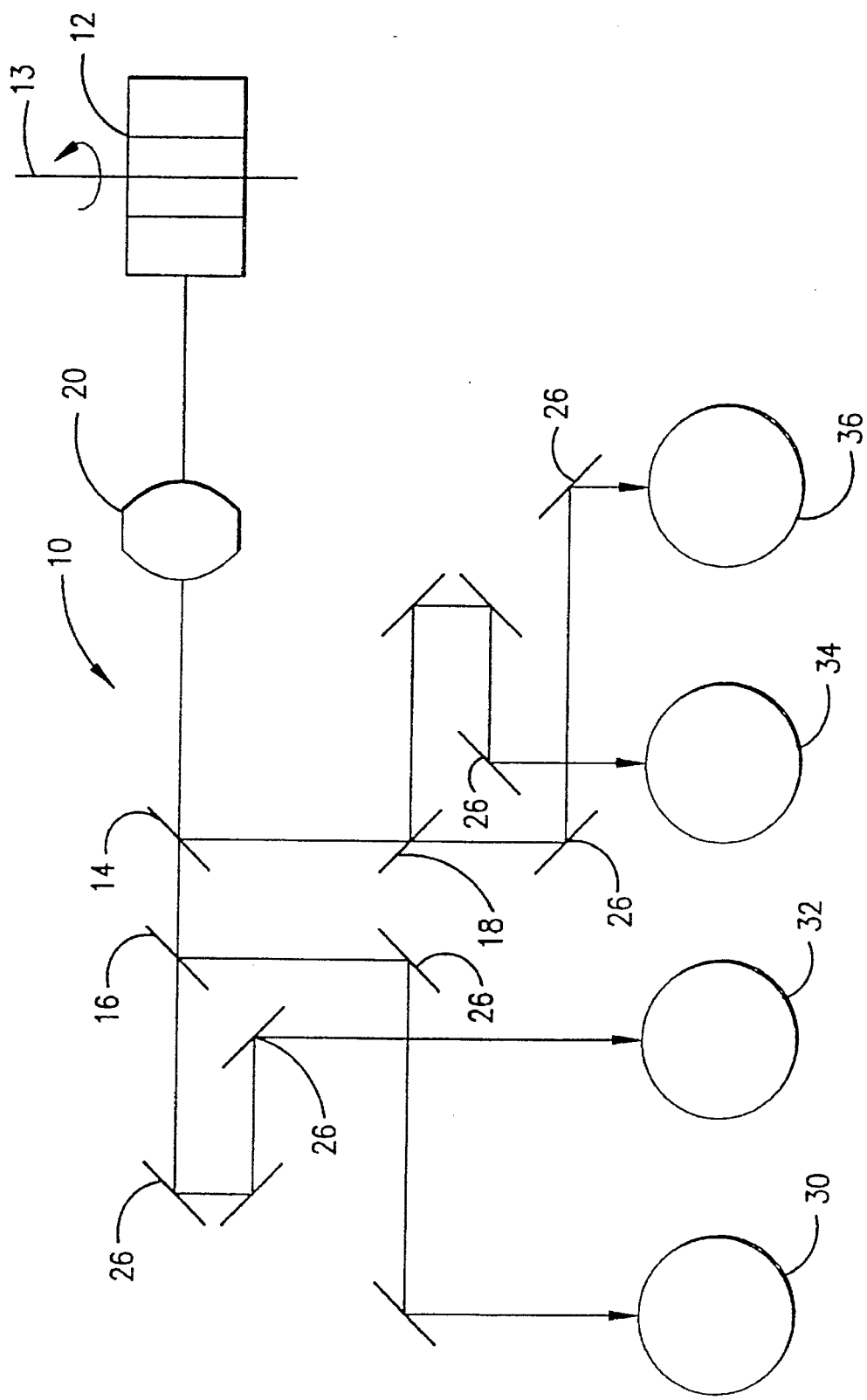
FIG. 1 is a schematic view of a multi-station printer.
Figure 6:
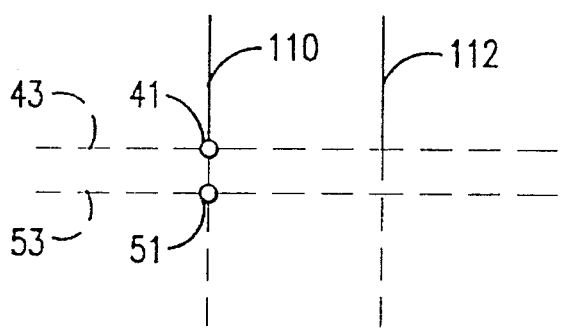
FIG. 6 shows vertical lines extending in a process direction.

Those skilled in the art will appreciate that the above-described method and apparatus can be incorporated into a multi-spot printer utilizing only one photoreceptor as well as a multi-station printer such as illustrated in FIG. 1. In FIG. 1, each of the respective laser beams would be appropriately imaged onto a separate photoreceptor 30, 32, 34 or 36. Thus, when the respective color image is imaged on a copy sheet or intermediate belt, the respective scan lines will be properly registered in the fast scan direction as shown in FIG. 6. Additionally, the above-described apparatus is not limited to four laser beams but rather may be incorporated into any practical number of laser beams.

Further, those skilled in the art will appreciate that other detectors may similarly be used with preferred embodiments to measure the spot velocities of light beams relative to the fast scan position.

While the invention has been described with reference to specific embodiments, the description is illustrative only and is not to be construed as limiting the scope of the invention. Various other modifications and changes may occur to those skilled in the art without departing from the spirit and scope of the invention.

What is claimed is:

1. A method for adjusting pixel placement in a raster scanning system, the method comprising the steps of:

measuring a spot velocity of a first beam based on a position in a fast scan direction as the first beam scans in the fast scan direction;

measuring a spot velocity of a second beam based on a position in the fast scan direction as the second beam scans in the fast scan direction;

determining pixel placements of the fast beam relative to the position along the fast scan direction from the spot velocity of the first beam;

determining pixel placements of the second beam relative to the position along the fast scan direction from the spot velocity of the second beam; and adjusting a firing rate of at least the second beam based on the position along the fast scan direction to appropriately adjust pixel placements of the second beam along the fast scan direction to desired pixel placements.

2. The method of claim 1, further comprising the step of adjusting a firing rate of the first beam based on the positioning the fast scan direction to appropriately adjust pixel placements of the first beam along the fast scan direction to desired pixel placements.

3. The method of claim 1, wherein the desired pixel placements include the pixel placement of the first beam.

4. The method of claim 1, wherein the step of measuring the spot velocity of the first beam comprises the steps of:

scanning the first beam across a measuring device, the measuring device having openings at selected areas for allowing light to pass; and detecting a frequency of the first beam passing through the openings in the measuring device.

5. The method of claim 4, wherein the measuring device comprises a diffraction grating.

6. The method of claim 4, wherein the measuring device comprises a Ronchi ruling.

7. The method of claim 1, wherein the step of measuring the spot velocity of the second beam comprises the steps of:

scanning the second beam across a measuring device, the measuring device having openings at selected areas for allowing light to pass; and detecting a frequency of the second beam passing through the openings in the measuring device.

8. The method of claim 7, wherein the measuring device comprises a diffraction grating.

9. The method of claim 7, wherein the measuring device comprises a Ronchi ruling.

10. The method of claim 1, further comprising the steps of:

scanning the first beam across an image receiving device along the fast scan direction;

scanning the second beam across the image receiving device along the fast scan direction at the adjusted firing rate so that the pixel placements of the second beam relative to the positions in the fast scan direction are appropriately adjusted.

11. The method of claim 10, wherein the image receiving device comprises at least one photoreceptor.

12. The method of claim 10, wherein the adjusted firing rate corrects for different scan linearities along the fast scan direction between the first beam and the second beam.

13. The method of claim 1, further comprising the steps of:

measuring a spot velocity of a third beam based on a position in the fast scan direction as the third beam scans in the fast scan direction;

determining pixel placements of the third beam relative to the position along the fast scan direction from the spot velocity of the third beam; and adjusting a firing rate of the third beam based on the position along the fast scan direction to appropriately adjust pixel placements of the third beam along the fast scan direction to the desired pixel placements.

14. The method of claim 13, further comprising the steps of:

measuring a spot velocity of a fourth beam based on a position in the fast scan position as the fourth beam scans along the fast scan direction;

determining pixel placements of the fourth beam relative to the position along the fast scan direction from the spot velocity of the fourth beam; and adjusting a firing rate of the fourth beam based on the position along the fast scan direction to appropriately adjust pixel placements of the fourth beam along the fast scan direction to the desired pixel placements.

15. A method of adjusting the pixel placement of beams on an image receiving device, the method comprising the steps of:

measuring a spot velocity of a first beam relative to a position of the first beam along a fast scan direction as the first beam scans across a detection device;

measuring a spot velocity of a second beam relative to a position of the second beam along the fast scan direction as the second beam scans across the detection device; and adjusting a firing rate of the second beam based on the position of the second beam along the fast scan direction so that the first beam and the second beam have substantially equal pixel placements along the fast scan direction and across the image receiving device, the adjusted firing rate correcting for different scan linearities between the first beam and the second beam.

16. A method of equalizing the pixel placement of at least two beams on an image receiving member, the method comprising the steps of:

scanning a first beam across a diffraction grating along a fast scan direction;

detecting pixel placements relative to a fast scan position of the first beam scanned across the diffraction grating;

scanning a second beam across the diffraction grating along the fast scan direction;

detecting pixel placements relative to the fast scan position of the second beam scanned across the diffraction grating;

adjusting the pixel placements of the first beam to a desired pixel placement based on the fast scan position;

adjusting the pixel placements of the second beam to the desired pixel placement based on the fast scan position;

scanning the first beam across the image receiving member along the fast scan direction with the adjusted pixel placements of the first beam; and scanning the second beam across the image receiving member along the fast scan direction with the adjusted pixel placements of the second beam, the adjusted pixel placements correcting different scan linearities between the first beam and the second beam.

17. An apparatus for adjusting pixel placement in a raster scanning system, the apparatus comprising:

first measuring means for measuring a spot velocity of a first beam based on a position in a fast scan direction as the first beam scans in the fast scan direction;

first determining means for determining pixel placements of the first beam relative to the positions along the fast scan direction from the spot velocity of the first beam;

second measuring means for measuring a spot velocity of a second beam based on a position in the fast scan direction as the second beams scans in the fast scan direction;

second determining means for determining pixel placements of the second beam relative to the position along the fast scan direction from the spot velocity of the second beam; and adjusting means for adjusting a firing rate of the second beam based on the position of the second beam along the fast scan direction to adjust pixel placements of the second beam along the fast scan direction to desired pixel placements.

18. The apparatus of claim 17, wherein the desired pixel placements include the pixel placement of the first beam.

19. The apparatus of claim 17, wherein the adjusting means further adjusts a firing rate of the first beam based on the position of the first beam along the fast scan direction to the desired pixel placements.

20. The apparatus of claim 17, wherein the first and second measuring means comprise a diffraction grating having openings for allowing light to pass and a detecting device that detects the light passing through the openings of the diffraction grating.

21. The apparatus of claim 17, wherein the adjusting means equalizes the pixel placements of the first and second beams on an image receiving member.

22. The apparatus of claim 17, further comprising:

an image receiving device; and a scanning device that scans the first beam and the second beam across the image receiving device, the adjusting means adjusting the firing rate of the second beam so that the first beam and the second beam scan with equal pixel placement across the image receiving member.

23. The apparatus of claim 22, wherein the image receiving device comprises at least one photoreceptor.

24. The apparatus of claim 22, wherein the scanning device includes a rotating polygon mirror.

25. The apparatus of claim 17, wherein the first and second measuring means both comprise an integrating sphere extending along a scanning direction, a tube located within the integrating sphere and a sensing device connected to opposite longitudinal ends of the tube.

26. The apparatus of claim 25, wherein the sensing device includes photomultiplier tubes.

27. An apparatus for equalizing the pixel placement of at least two light beams, the apparatus comprising:

a diffraction grating;

a scanning device that scans a first beam across the diffraction grating in a fast scan direction and scans a second beam across the diffraction grating in the fast scan direction;

a determining device that determines pixel placements of the first beam relative to a position along the fast scan direction as the first beam is scanned across the diffraction grating and determines pixel placements of a second beam relative to the position along the fast scan direction as the second beam is scanned across the diffraction grating; and an adjusting device that adjusts pixel positions of at least one of the first beam and the second beam based on the position along the fast scan direction to desired pixel positions.

* * * * *